Sept. 2, 1941.  A. L. RICHE  2,254,782
APPARATUS FOR TESTING WATER AND OTHER LIQUIDS
Filed Sept. 13, 1935  6 Sheets-Sheet 2
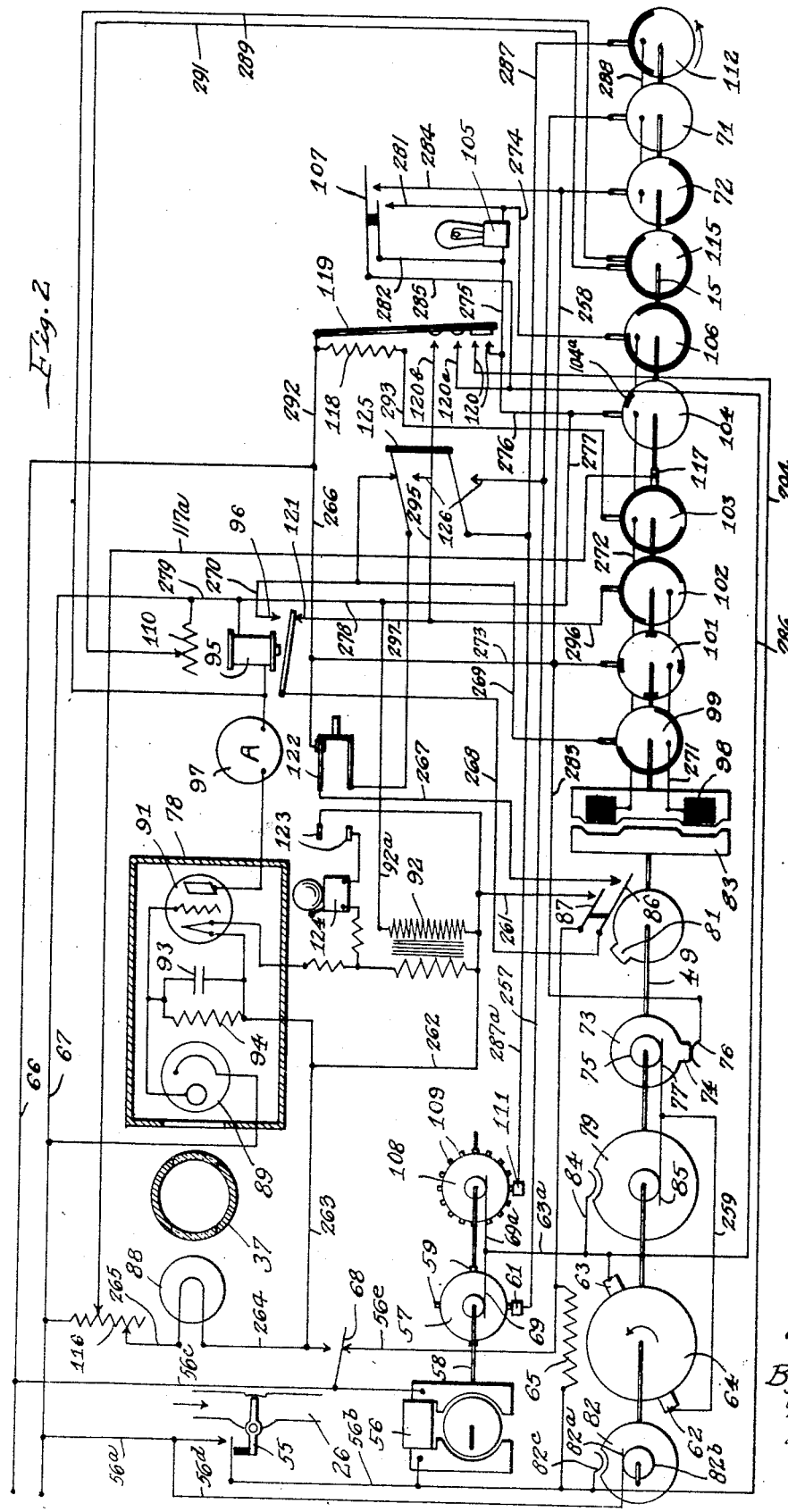

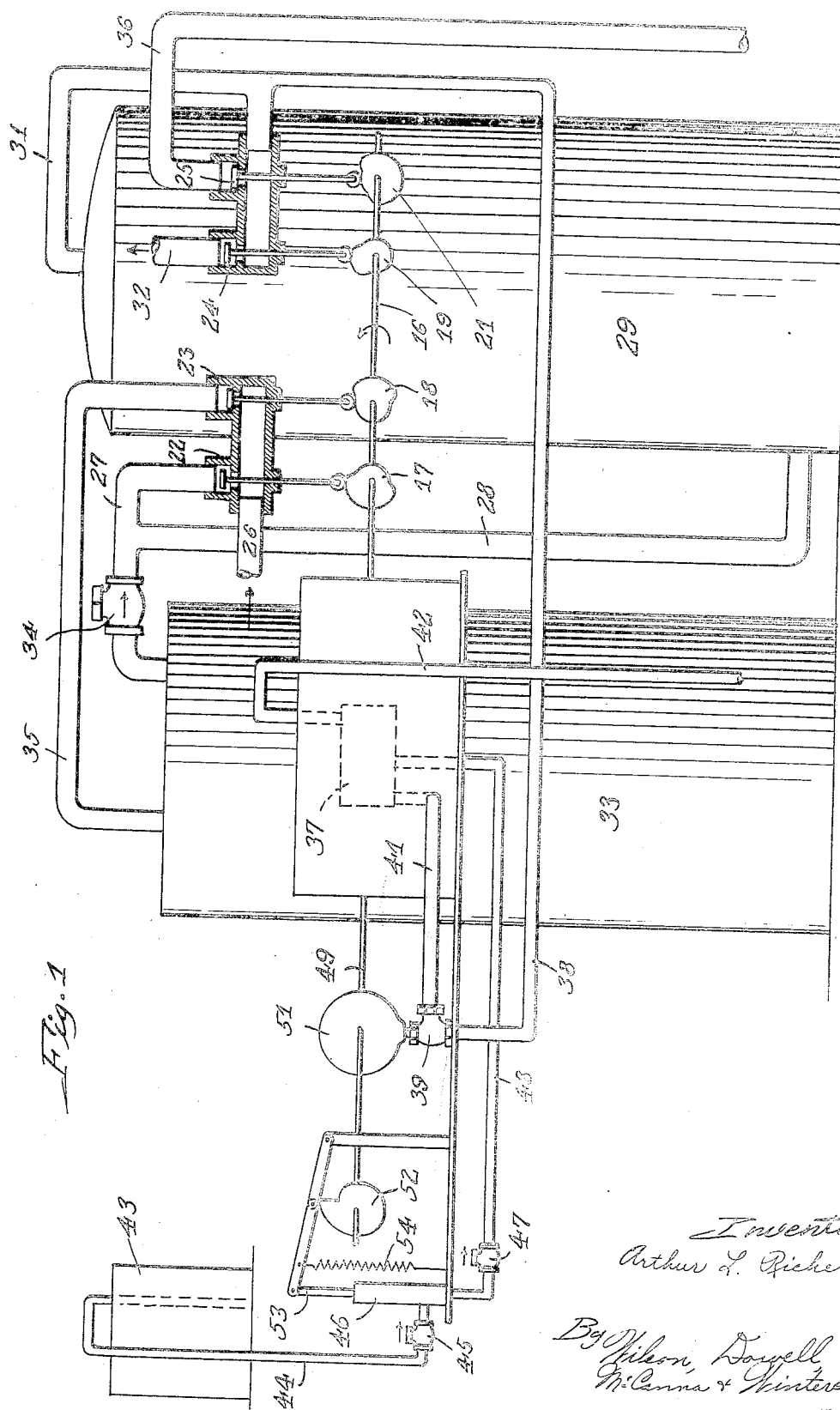

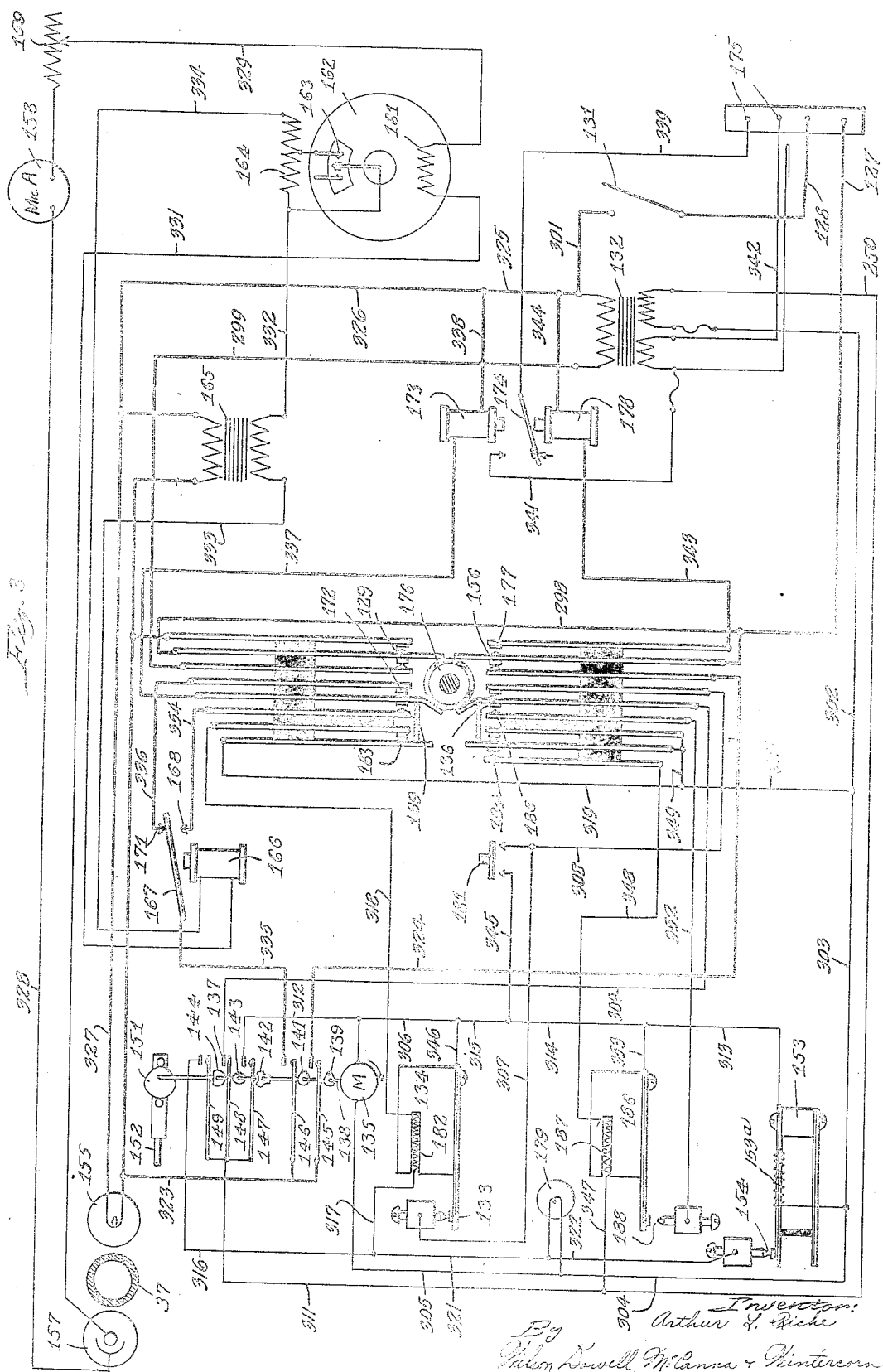

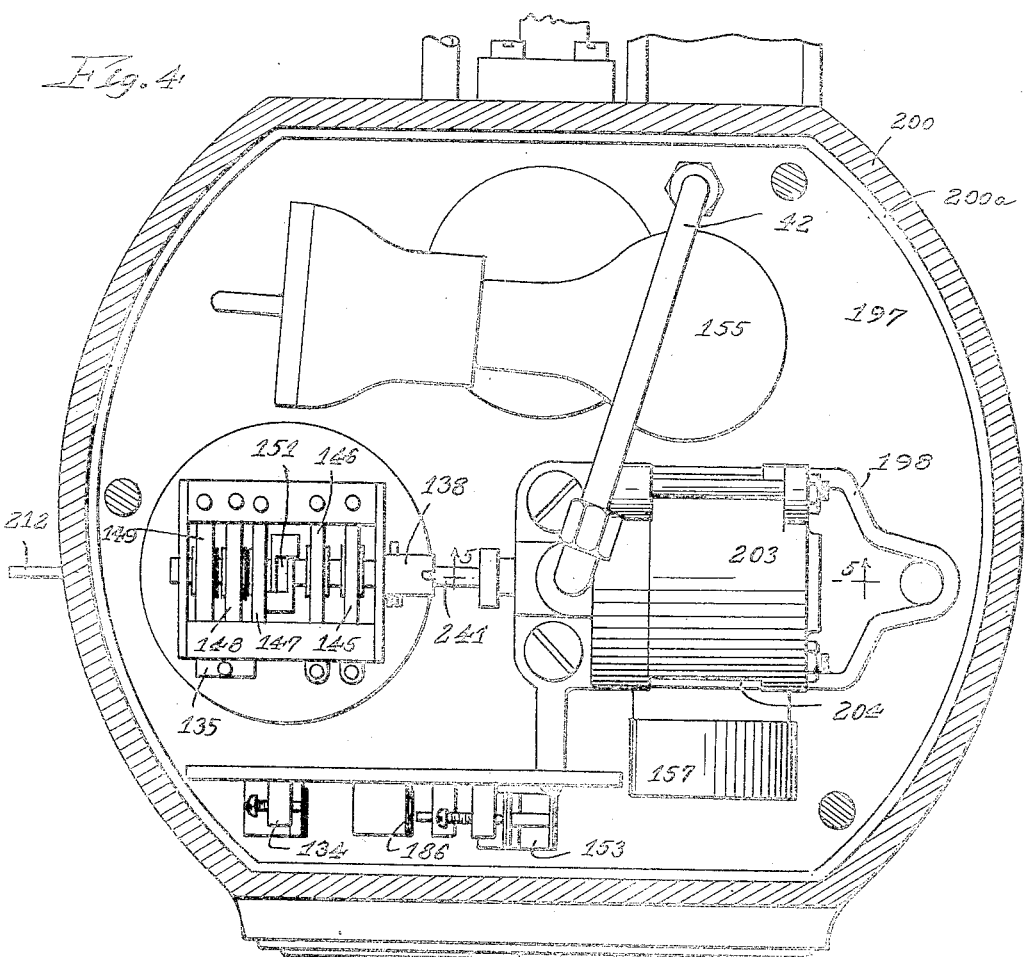

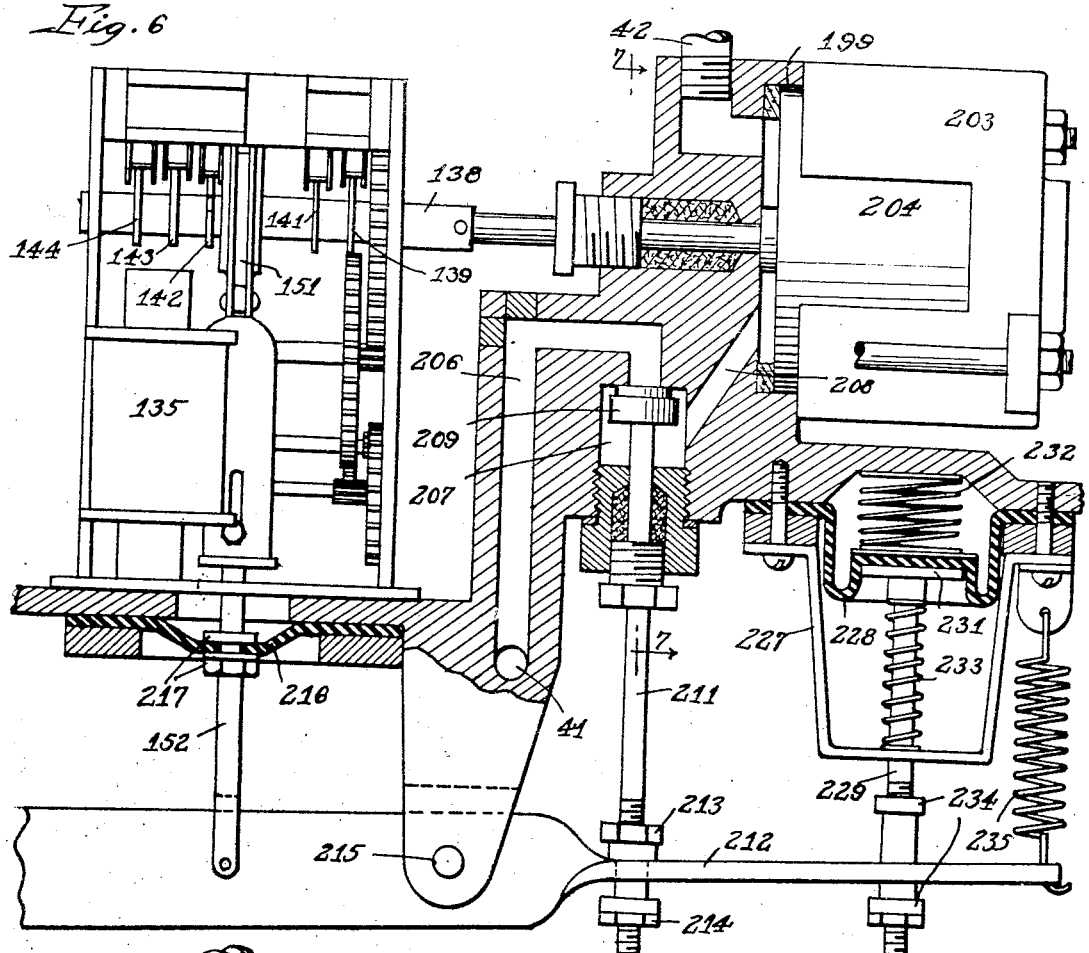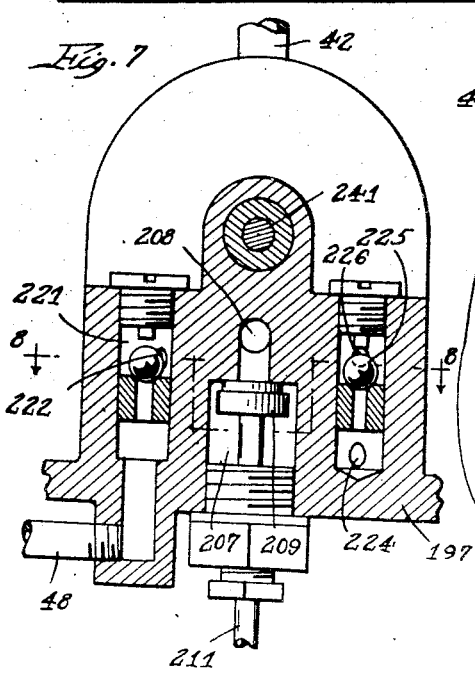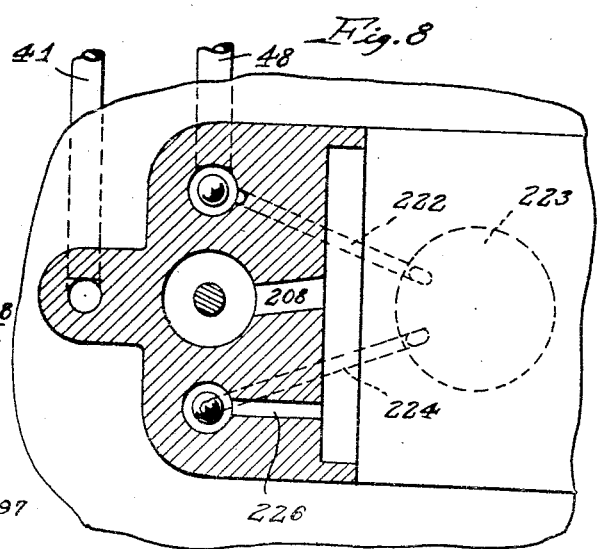

Sept. 2, 1941.   A. L. RICHE   2,254,782
APPARATUS FOR TESTING WATER AND OTHER LIQUIDS
Filed Sept. 13, 1935   6 Sheets-Sheet 6
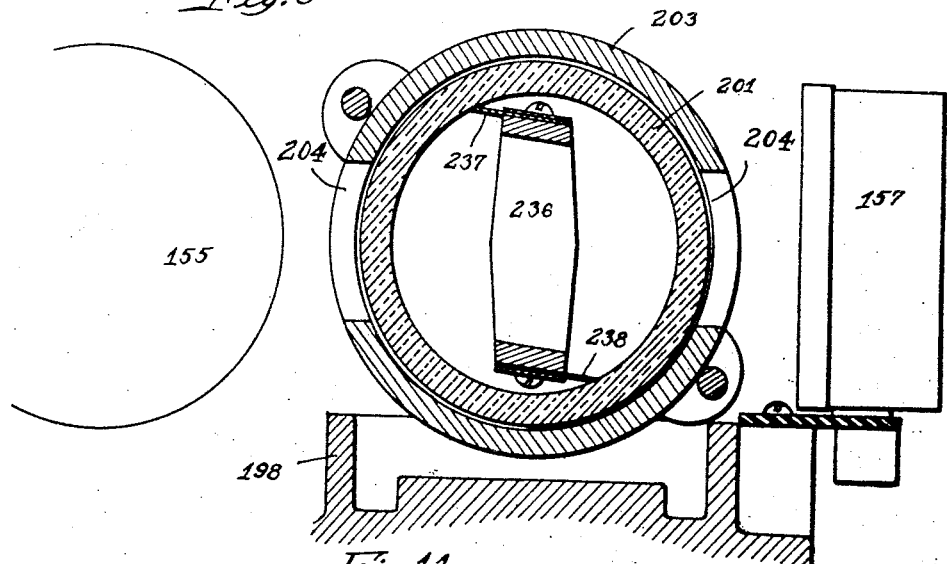
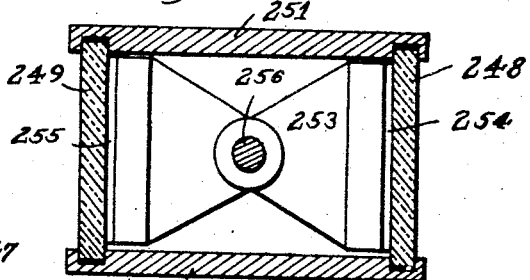
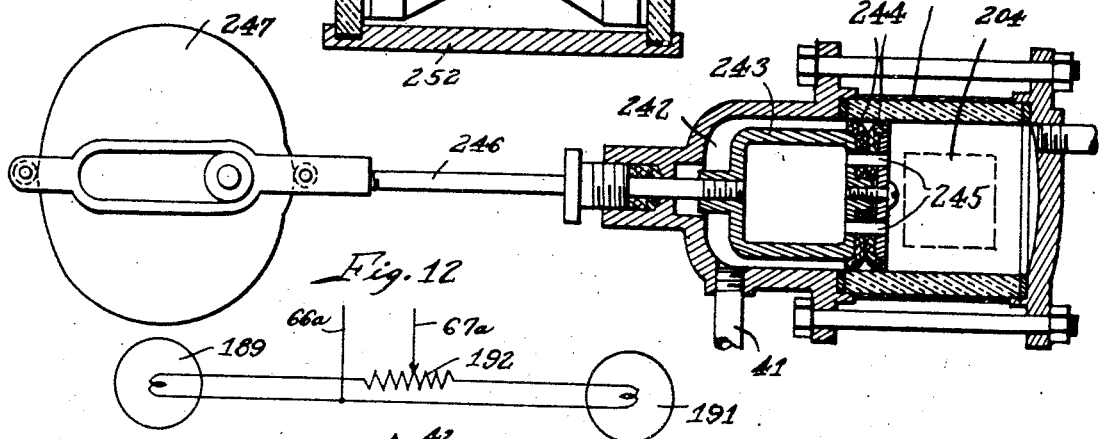
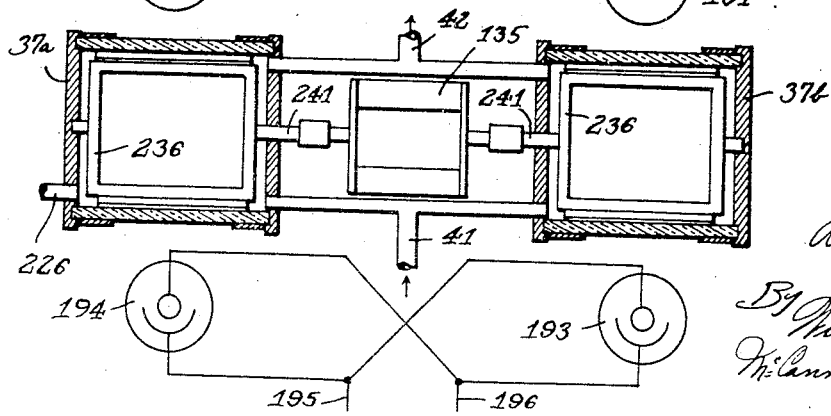
Inventor:
Arthur L. Riche
By Wilson, Dowell,
McKenna & Wintercorn
Attys.

Patented Sept. 2, 1941

2,254,782

UNITED STATES PATENT OFFICE 2,254,782

APPARATUS FOR TESTING WATER AND OTHER LIQUIDS

Arthur L. Riche, Freeport, Ill.

Application September 13, 1935, Serial No. 40,379

3 Claims. (Cl. 88—14)

This invention relates specifically to water testing devices intended primarily for the testing of flowing fluids.

An object of the invention is the provision of generally improved means for testing a stream of changing fluid.

I have also aimed to provide testing mechanism for liquids wherein means are provided for preventing changes in the light absorption characteristics of the test vessel under adverse testing conditions.

A still further object is the provision of a testing device wherein changes in the character of the liquid other than the change under test will not interfere with the accuracy of the tests.

Other objects and attendant advantages will be apparent from the following description and the accompanying drawings, in which—

Figure 1 is a diagrammatic view showing a water softener embodying my invention;

Fig. 2 is a diagrammatic showing of the testing and actuating mechanisms;

Fig. 3 is a diagrammatic showing of a second form of the testing device adapted to emit signals for the guidance of the operator in the manual operation of the softener;

Fig. 4 is a top view of a testing device made in accordance with Fig. 3;

Fig. 5 is a section on the line 5—5 of Fig. 4 showing the testing cell and wiper;

Fig. 6 is a vertical section through the device shown in Fig. 4;

Fig. 7 is a section on the line 7—7 of Fig. 6;

Fig. 8 is a section on the line 8—8 of Fig. 7;

Fig. 9 is a section on the line 9—9 of Fig. 5;

Fig. 10 is a longitudinal section through a modified form of cell and cell wiper showing means for actuating the wiper;

Fig. 11 is a section through a further modified form of cell and cell wiper; and Fig. 12 is a diagrammatic showing of a modified form of observation cell, photo-electric cell and lamp unit adapted to replace the observation cell, photo-electric cell and lamp in either the form shown in Fig. 2 or that shown in Fig. 3, for use under particular conditions as will hereinafter appear.

The invention as herein shown contemplates an automatic zeolite water softener including water softening mechanism, valve mechanism for controlling the flow through the softener, and testing mechanism for testing the effluent from said softener to actuate the control mechanism in response to changes in the effluent from the softener. It will be understood that the test mechanism, while designed for the control of a zeolite softener, will find numerous other uses in the control and actuation of fluid treating mechanism, as, for example, in the control of filtration and sedimentation processes, the chlorination of water, and numerous other processes, and the invention contemplates such uses for the testing device. This is a continuation in part of my copending application, Serial No. 369,592, filed June 10, 1929.

In Figs. 1 and 2 I have shown in diagrammatic form the apparatus for testing and controlling the operation of a zeolite water softener which is so arranged that it may be used either for operating the softener in a completely automatic manner, or to perform the tests and emit signals to indicate when the operations should be performed manually. The control mechanism has a driven shaft diagrammatically shown at 15 adapted to be integral with or connected to a shaft 16 (Figure 1) when the control device is used for automatic actuation of a softener. The shaft 16 carries cams 17, 18, 19 and 21 adapted to actuate valves 22, 23, 24 and 25, respectively. In the particular valve arrangement shown in Figure 1, the valves 22 and 23 are interconnected and the valves 24 and 25 are interconnected, though this particular arrangement is shown merely by way of illustration, and numerous other suitable valve arrangements are well known in the art. A pipe 26 is connected to a supply of hard water which during normal softening operation passes through pipes 27 and 28 to the bottom of the softener tank indicated generally by the numeral 29. The softened water emerges from the softener through the pipe 31 and passes into the service line 32 by way of the valve 24, the valves in Figure 1 being shown in the service position. A brine tank 33 is connected to pipe 27 through check valve 34 and to valve 23 by line 35 in such manner that when hard water is passed into the line 35 through opening of the valve 23, brine will be forced out of the tank by way of the check valve 34 into the line 28 to the bottom of the softener. The valve 25 is connected to drain through a pipe 36.

The testing and control device has an observation cell 37 provided with a pair of glass windows through which light may be projected. This cell is connected to the outlet of the softener by means of a pipe 38, a valve 39 and a pipe 41 and to drain through a pipe 42. The observation cell is also connected to a source of reagent supply 43 through a pipe 44, a check valve 45, a pump 46, a check valve 47, and a pipe 48. A shaft 49 is driven from a motor shaft of the control mechanism in a manner which will presently appear so as to periodically make one complete revolution for the purpose of performing a test. During this rotation of the shaft a cam 51 allows the stem of the valve 39 to rise, shutting off the flow of water to the cell 37 and shortly thereafter a cam 52 on the shaft 49 releases the piston 53 of the reagent pump, a spring 54 causing the return of the piston and the simultaneous injection of a quantity of reagent into the cell 37. This reagent has the property of reacting chemically with the calcium and magnesium salts in the hard water to produce a precipitate, though it will be understood that where the device is used for a purpose other than the detecting of hardness or brine in the water, any other suitable reagent will be employed which will produce a physically perceptible change in the solution in the cell 37. In the present instance a suitable reagent is a standard solution of potassium salts of non-volatile fatty acids (of which corn oil has been found preferable) held in solution by the addition of a sugar or glycerine and filtered at a low temperature.

The control mechanism shown in Fig. 2 is effective to make periodic tests on the effluent from the softener and in response to said tests rotate the shaft 16 a quarter turn when the effluent water becomes hard, thus initiating regeneration of the softener. The mechanism is also effective to make periodic tests of the effluent from the softener when brine is being admitted thereto and upon the appearance of brine in the effluent from the softener to again turn the shaft 16 through a quarter turn for the purpose of stopping the flow of brine. Thereafter the brine is allowed to stand in the softener tank for a predetermined period which is automatically measured by the control mechanism at the termination of which the control mechanism rotates the shaft 16 through a further quarter turn bringing the softener valves into the rinse position. Thereafter the test and control mechanism tests the effluent from the softener and when the spent brine has been completely washed from the softener automatically again turns the shaft 16 through a final quarter turn returning the valves to the service position.

I will now describe in detail the structure by which this automatic actuation of the valves is accomplished.

A flow switch 55 is positioned in the water line 26 carrying hard water to the softener so that the contacts thereof are closed only when water is flowing in the pipe 26 in quantity greater than that required for test purposes. The switch 55 is connected into a circuit 56a, 56b and 56c of a synchronous self-starting timing motor 56 of the type used in clocks so that the timing motor only runs when water is flowing in the pipe 26, except to open the contacts during a test, the purpose being to test the water at certain intervals based on the time the water flows. A contact disk 57 is carried on a shaft 58 driven by the timing motor 56 and carries a plurality of contacts 59 adapted to engage a fixed contact 61 at spaced intervals, dependent upon the relationship between the shaft 58 and the motor, to initiate a test. In this particular construction the shaft makes a complete revolution each hour of running time so that tests are initiated each time water has flowed in the pipe 26 for a total of fifteen minutes. The interval can, of course, be regulated to suit requirements.

When contacts 59 and 61 are closed, the circuit is closed between the poles 62 and 63 of a repulsion motor 64, the field 65 of which is energized by current flowing from electrical supply lines 66 and 67 by way of lead 56a, flow switch 55, wire 56b, a wire 56e a manually operated switch 68 and wire 56c. The circuit through the poles of the motor is closed through a wire 63a, brush 69 on contact disk 57, the contacts 59 and 61, a wire 257, contact disks 71 and 72 which are electrically interconnected, leads 258 and 263, a disk 73 having contacts 74 and 75 and brushes 76 and 77, and a wire 259. Upon the closing of this circuit the drive motor 64 begins to rotate, turning shaft 49 to which it is geared by suitable gearing not shown.

The contact disk 73 together with contact disks 79, 81 and 82, cams 51 and 52, and a clutch member 83 are carried on the shaft 49 and rotate with it. A brush 84 is connected to the motor pole 63 and is positioned to be out of contact with disk 79 when the drive motor is stopped but to engage the disk upon slight rotation thereof to complete the circuit between the poles by way of the disk 79, a brush 85 associated therewith and wire 259. Shortly thereafter the contact 74 leaves the brush 76 breaking the starting circuit at this point. A wire 56d shunts around the flow switch 55 and connects with a brush 82a engaging a contact ring 82b on the disk 82 and a brush 82c connected into the circuit including the wire 56b engages the disk 82 at all points except the starting point to insure continuous supply of current to the field 65 through a complete revolution of the shaft 49.

When the motor 64 starts, cam 51 on the shaft 49 cuts off the flow of water through observation cell 37, whereupon cams 52 causes reagent to be injected into the sample of water retained in the observation cell. A delay ensues while shaft 49 continues its rotation to the point where cam 81 engages interconnected switches 86 and 87. Thereupon switch 87 closes, the contacts therein being closer spaced than the contacts of switch 86, causing current to flow through a lamp 88 by way of wires 56c, switch 68, wire 256, wires 261, 262, 263, 264, 265, and resistance 116, and projecting a beam of light through the observation cell 37 onto a light sensitive cell 89 connected to an amplifying tube 91 in such manner that a decrease of illumination on the light sensitive cell causes an increase of tube output. The light sensitive cell and amplifying unit are advantageously enclosed as shown at 78 to exclude extraneous light.

The power supply is alternating from a transformer 92 which is energized by way of wire 56c, switch 68, wire 256, switch 87, wire 261, 92a and wires 278 and 279, but both the photoelectric cell and the amplifying triode act as halfway rectifiers on opposite sides of the cycle. A condenser 93 serves to bring the two sufficiently into phase so that the potential drop over a resistance 94 puts the negative bias on the grid of the tube which reduces the plate current to zero, when the intensity of light from the lamp 88 is properly adjusted.

If soft water is flowing in the observation cell 37 when the flow of water is cut off, the injection of reagent therein has no effect upon the light absorption characteristics of the fluid and the drive motor 64 continues its operation until the shaft 49 has been driven through a complete revolution without the remainder of the mechanism being actuated. However, when hard water begins to appear in the effluent from the softener, the observation cell 37 will necessarily contain water having a certain degree of hardness so that when the reagent is injected it will react with the hardness producing constituents of the water such as the calcium and magnesium salts, causing a precipitation within the observation cell which interferes with the passage of light therethrough. When this precipitate becomes sufficient to block the light to a predetermined degree, the output from the tube 91 will reach a point sufficient to actuate a relay 95 causing it to pick up and close a contact 96, the current concurrently passing through a milliammeter 97 which gives a visual indication to the operator. The cam 81 which has continued its rotation, as previously described, closing the contact 87, now closes the contact 86. Upon closing of the contact 86 nothing happens unless the relay 95 has picked up, in which case current will flow through a magnetic clutch 98 by way of a wire 266, a switch 122, a wire 267, the contact 88, a wire 268, the relay contact 96, wires 270 and 269, a contact disk 99, conductor 271, a conductor 272, contact disk 104, wires 277, 278 and 279 causing the magnetic clutch to engage and rotate the shaft 15 until the circuit is broken at contact disk 104, whereupon the clutch will release and the shaft 49 will complete its revolution independently. Thereupon a lamp 105 is in circuit with the clutch 98 through a wire 266, a wire 273, a contact disk 101, wire 271, clutch 98, wire 272, contact disk 106, wire 274, lamp 105, and wires 275, 276, 277, 278 and 279, the burning of the lamp 105 indicating to the operator that the softener is in need of regeneration. While the lamp 105 is in series with the clutch, it does not permit enough current to pass to hold the clutch in engagement. The operator then depresses switch 107 shunting out the lamp 105 and closing the circuit through the clutch by way of wires 266 and 273, disk 101, wire 271, clutch 98, wire 272, disk 106, wire 274, a wire 281, switch 107, a wire 282, and wires 275, 276, 277, 278 and 279, and holds switch 107 closed until insulator 104a of contact disk 104 has moved beyond its brush to establish the circuit direct from wire 272 to 277. The closing of the switch 107 simultaneously closes the circuit between the poles 62 and 63 of the drive motor by way of wire 259, brush 77, contact 74, brush 76, wires 283, 288 and 284, switch 107 and wires 285 and 286, thus causing this shaft 49 to again rotate through one revolution. During this rotation of the shaft 49 the clutch 98 will remain engaged until the circuit is broken at contact disk 101, causing the shaft 15 to be rotated a sufficient distance to complete a quarter turn thereof and moving the valves (Figure 1) into a position to close the valve 22, open the valve 23, close the valve 24 and open the valve 25, thereby placing the valves in a position to admit brine from the brine tank 33 into the softener tank 29. Where it is desired to operate the softener in a completely automatic manner, the switch 107 is maintained closed at all times so that when the relay 95 picks up, the shaft 15 will not be stopped by operation of the contact disk 104 but will pass completely through a quarter turn into the brine position.

In this position of the shaft 15 and of the softener valves, brine is being fed into the softener and tests are performed to determine when this brine has completely displaced the water in the softener. For this purpose a contact disk 109 is carried on the shaft 88 of the timing motor and has a plurality of contacts 109 adapted to make contact with an opposed contact 111 at more frequent intervals. When brine has begun to come through the softener it will appear in the observation cell 37 at one of the successive tests causing the relay 95 to pick up upon closing of the contact 87, the contact 111 being connected to a contact disk 112 by conductors 207a and 207, the circuit between the poles 62 and 63 being closed through the wire 63a, a brush 69a, disk 100, contact 111, conductors 287a and 207, disk 112, a conductor 288, disk 72, wires 289 and 289, brush 76, contact 74, disk 73, contact 75, brush 77 and wire 259. With the relay 95 closed, the closing of the contact 86 completes the circuit through the magnetic clutch by way of the contact disks 99 and 104 as previously described and maintains the clutch closed for a quarter turn through the establishment of a circuit through the contact disk 101. This brings the valves of the softener to a position in which all of the valves except 22 are closed holding the brine quiescent in the softener for the completion of reaction between the brine and the zeolite.

It will be observed that when the brine is being passed into the softener and emerges therefrom in the effluent line so as to reach the observation cell 37, the brine will come through the softener in high concentration. Furthermore, this effluent will be spent brine containing principally calcium and magnesium salts obtained from the zeolite bed. This high concentration of spent brine will produce a large amount of precipitate in the observation cell upon reaction with the reagent and will obscure most of the light from the lamp 88, thereby giving a very high tube output. In order to change the test range and protect the relay 95 its sensitivity is decreased during the tests when the valves occupy the brine intake position by the closing of an adjustable shunt around the relay coils which is accomplished by contact disk 115, wires 290 and 291, and resistance 116. Furthermore, for the best results from the tube its output should be held below a certain maximum which is accomplished by shunting a part of the control resistance 116 in series with the lamp by way of wires 279, 278, 277, disk 104, conductor 272, disk 106, a contact 117 and a conductor 117a thus increasing the illumination on the photo-electric cell 89 and decreasing the tube output.

As the shaft 15 moves into the last mentioned or soaking position, a circuit is closed between the power lines through contact disks 103 and 104, the current passing through the resistance 118 of a thermal timer designated generally by 119 by way of a wire 292, resistance 118, a wire 293, disk 103 and associated brush, conductor 272, disk 104 and associated brush, and wires 277, 278 and 279. Upon the lapse of a predetermined period of time, the blade of the thermal timer will cause contacts 120 to be made to close the circuit through the winding 65 of the motor 64 by way of wire 56c, switch 68, wire 56e, winding 65, a wire 294, contact 120, and wires 276, 277, 278 and 279. The blade also closes the circuit through the poles 62 and 63 of the drive motor through wire 286, contact 120a, the timer blade 119, wires 292, 266, 273, 283, the contact brush 76, contact 74, disk 73, contact 75, brush 77 and wire 259, causing the shaft 49 to rotate through a complete turn, and simultaneously the circuit through the magnetic clutch will be closed by way of wire 292, the thermal timer blade 119, contact 120b, wires 295 and 296, contact disk 102, conductors 271 and 272, disk 104 and conductors 277, 278 and 279. Shortly after movements of valves begin a new circuit is set up by current flowing directly through wires 266, 273 and disk 101 to wire 271. The shaft 15 is then indexed an additional one-quarter turn so as to open valve 22, close valve 23, close valve 24 and open valve 25 so that water will flow through the softener and into drain by way of the pipe 36. As water flows through the softener, the timing motor 56 will periodically cause the closing of the contacts 109 and 111 to bring about periodic tests on the effluent. Since spent brine is passing through the observation cell 37 during the initial part of this test period, the relay 95 will be picked up upon each of the tests so that when the contact 86 is closed the circuit through the clutch 98 cannot be completed through the contact disk 102. However, when the spent brine is completely washed from the softener, no precipitation will occur in the observation cell and consequently the relay 95 will not pick up so that when the switch 86 is closed the circuit through the clutch 98 will be closed by way of wire 266, switch 122, wire 267, switch 86, wire 268, the relay, contact 121, a wire 297, wire 296, disk 102, conductors 271 and 272, disk 104, and wires 277, 278 and 279, causing the shaft 15 to rotate through the final one-quarter turn, returning the valves to the service position shown in Figure 1 and completing the regeneration of the softener, disk 101 and wires 266, 273, maintaining the circuit closed after the opening of the relay. At this point the flow switch 55 and timing motor 56 again take up the duty of initiating periodic tests on the effluent soft water from the softener.

The switch 68 is provided to permit manual calibration and adjustment of the light sensitive testing mechanism as desired without in any wise affecting the actuating mechanism for the shafts 49 and 15. By closing this switch to complete circuit directly from wire 56c to wire 266 the lamp 88 is caused to come on, and the effect of this may be observed on the milliammeter 97.

Where the testing and actuating device is desired to be used as an alarm mechanism with the valves to be operated manually, a switch 122 is provided adapted to be thrown to the left facing Fig. 2 to close contacts 123 to a bell 124 or other signal device. With the switch in this position when the test indicates water of more than the desired hardness, the bell will ring during the time that contact 86 is closed. Likewise, when the test for brine in the wash water is desired, a switch 125 is thrown from the position shown in Fig. 2 to a lower position to close contacts 126 which places the contacts 109 and 111 in control of the testing time and the contact 121 of the relay 95 in control of the bell so that a signal will be given when water free of hardness producing constituents passes into the observation cell 37 and the next succeeding test is accomplished.

Referring now more particularly to Fig. 3, wherein I have shown a modified form of testing device adapted to emit a signal upon the appearance of hard water in the effluent line of the softener or upon the elimination of spent brine from the wash water of the softener, the numerals 127 and 128 indicate the electric lines supplying power to the device under commercial voltages, the current passing through a wire 298, a switch 129, wires 299 and 301 and a line switch 131 to energize a transformer 132. Current from the transformer then flows through wires 302, 303, 304 and 305 through a motor 135, a wire 306, contacts 133 of a thermal timer 134, wires 307 and 308, a switch 136, a wire 309, a switch blade 148 and contact 137 carried on the shaft 138 of the motor 135 and wires 311 and 250. It will be understood that the relationship between the shaft 138 and the motor 135 is diagrammatic and that suitable gearing will be interposed between the motor shaft and the shaft 138. The shaft 138 carries cams 139, 141, 142, 143 and 144 adapted to actuate switch levers 145, 146, 147, 148 and 149, the switch lever 148 controlling the contact 137. Upon closing of the circuit through the motor 135 as previously set forth, the motor is energized traveling in the direction indicated by the arrow; that is, in a clockwise direction facing Fig. 3. Thereupon, the switch lever 149 is made by the cam 144, the switch lever 147 is made by the cam 142 and the switch lever 148 is opened by the cam 143. The motor continues to rotate until the switch lever 147 is again opened by the cam 142 current being supplied for this purpose by way of wires 250, 311, switch lever 147, a wire 312 and wires 305, 304, 303 and 302. During this movement of the motor, a cam 151 carried thereon actuates a push rod 152 to cause the flow of water or other test fluid to the observation cell 37 to be established so that the fluid begins to flow through this cell. By the same operation reagent is drawn into a pump in a manner which will presently appear. During the time that the motor was running, current flowed through the coil 153a of a thermal timer 153 by way of wires 302, 303, coil 153a, wires 313, 314, 315, 306, 312, switch 147, and wires 311 and 250, causing the contacts 154 thereof to open, whereby to permit the motor to be stopped by operation of the cam 142 opening the switch lever 147. Also, upon starting of the motor, the cam 144 establishes the circuit through the heating coil 182 of the thermal timer 134 by way of wires 250, 311, switch 149, wires 316, 317 and 318, switch 183 and wires 319 and 302.

The thermal timer 153 is a rapidly acting timer and when the contact 154 thereof again closes, the motor starts and rotates the shaft 138 to next position, power being supplied through wires 250 and 311, switch 149, wires 316, 321 and 322, contact 154 and wires 313, 314, 315, 306, 305, 304, 303 and 302. Upon the start of shaft rotation, the cam 142 closes the switch lever 147 establishing a circuit through the motor by way of wires 250, 311, switch 147, wires 312, 305, 304, 303 and 302. Thereupon current again flows through the coil 153a of the thermal timer 153 to break the motor circuit at 154. During this rotation of the shaft 138, the flow of water through the observation cell 37 is cut off and reagent is injected therein. As before, the circuit through the motor is then opened by operation of the cam 142. When the thermal timer 153 is cooled sufficiently to again close the contacts 154, the motor starts and rotates the shaft 138, the motor being stopped in its initial starting position by operation of the cam 142 as heretofore described. During this final movement of the motor the cam 151 does not affect the reagent pump or the flow of the fluid under test because of a dwell on the cam 151.

During the last running period of the shaft 138, the cams 139 and 141 move the switch levers 145 and 146 to the closed positions, whereupon current flows to a lamp 155 by way of a wire 323, the switch lever 145, a wire 324, a switch 156, wire 127, wires 301, 325, 326, 327 and switch 131. A beam of light then passes from the lamp 155 to a light sensitive cell 157, that shown being of the self generating type the output of which is indicated on a microammeter 158 connected thereto by conductor 328 and which passes through an adjustable resistance 159 for the purpose of calibrating the circuit and through the coil 161 of a sensitive relay 162 by way of wire 329, the circuit being completed by a wire 331. So long as the light from the lamp 155 passes substantially unobstructed through the cell 37 or is obstructed therein less than a predetermined degree, the relay 162 will cause the closing of contacts 163 thereof and shunting out a part of a resistance 164 in a circuit including a wire 332, a transformer 165, a wire 333, a rugged relay 166 and a wire 334 causing the rugged relay to pick up and move the relay switch lever 167 thereof against a contact 168 which is positioned in a circuit including a switch 169 which is open during the testing of the water. However, should the light be obstructed beyond a predetermined degree in its passage through the observation cell, insufficient current will flow through the coil 161 of the sensitive relay to cause the closing of the contacts 163 in which case the rugged relay 166 will not be energized and a circuit will be established through wire 127, switch 156, wire 324, switches 145 and 146, a wire 335, the relay switch lever 167, a contact 171, a wire 336, a switch 172, a wire 337, a relay 173, wires 338, 325 and 301, a switch 131 and wire 128, the energization of which relay switch will move a switch lever 174 and close a circuit between the terminal posts 175 through wires 339, 341 and 342 and transformer 132 which posts are normally connected to a bell or other signal or operating device. Energy will continue to flow to the bell or other device until a switch actuating member 176 is momentarily moved to the right facing Fig. 3 from the central position shown in the drawings, causing switch contacts 177 to be closed, closing the circuit through a relay 178 which circuit comprises the wire 127, switch 177, wire 343, relay coil 178, wires 344 and 301, switch 131 and wire 128, which acts to draw the switch lever 174 to an open position, as shown in Fig. 3, thereby terminating the signal. The ringing of the bell or actuation of other devices therefore indicates that the water flowing through the observation cell 37 and consequently the effluent of the softener has begun to turn hard, and that regeneration of the softener is necessary. It will be observed that this may be set to give the alarm at any desired degree of hardness.

A signal lamp 179 is positioned in the circuit to connect wires 305—304 and 321—322 in such manner as to be illuminated during the period in which a test is in progress, and a push button or other switch mechanism 181 is provided, the actuation of which causes a test to be initiated at any time desired by the operator by closing circuit to the motor by way of wires 250 and 311, switch blade 148, contact 137, wire 309, switch 136, switch 181, wire 345, wires 315, 306, motor 135 and wires 305, 304, 303 and 302.

The frequency of the tests performed on the effluent from the softener is determined by the thermal timer 134 which is heated during the period of each test, by means of the heating coil 182 through which current flows by way of the switch lever 148 and a switch 183 as heretofore described. The coil 182 acts to heat the timer and cause warpage of the bimetallic blade in such direction as to open the contact 133, and upon the completion of the test, the circuit through the coil is broken by the cam 144. The timer then begins to cool and when the contact 133 is again closed a further test is initiated by way of wires 250 and 311, switch lever 148, contacts 137, wire 309, switch 136, wires 308 and 307, switch 133, wires 346, 306, motor 135, and wires 305, 304, 303 and 302.

During the regeneration of the softener, it is also of considerable importance for the operator to know when all of the spent brine has been washed out of the softener. For this purpose the operator moves the switch actuating member 176 to the left facing Fig. 3, from the central position shown, causing switches 172, 183 and 136 to be opened, and closing switches 169, 184 and 185. Thereupon a thermal timer 186 is heated by means of a coil 187 deriving current through the switch 184 by way of wires 250 and 347, wire 348, switch 184, wires 349, 351 and 302. This timer is made to have a considerable mass so that a period of time sufficient to wash most of the spent brine from the softener will elapse prior to the closing of the timer switch 188 thereof which remains closed until the member 176 is returned to the position shown in the drawings. When this switch closes, the circuit through the motor is closed by way of wires 250, 311, switch elements 148 and 137, wire 309, the switch 185, wire 352, switch 188, wires 353, 314, 315, 306, motor 135, and wires 305, 304, 303 and 302 starting the motor and starting the device through its cycle through which it passes in the manner already described with the exception that the switch 172 is now open and the switch 169 is now closed so that the alarm will sound when the relay 166 picks up instead of when it fails to pick up. In other words, when the contents of the observation cell fail to obscure the passage of light from the lamp 155 to the light sensitive cell 157, the spent brine will have all been washed from the softener and the relay 166 will pick up, closing the circuit through the relay 173 by way of the wire 128, switch 131, wires 301, 325, 338 and 337, the switch 169, wire 354, the contact 168, the switch lever 167, wire 335, the switch levers 146 and 145, the wire 324, the switch 156, and the wire 127, so that an alarm will be emitted indicating that the wash step of the regeneration is completed, and that the operator should return the softener to service, or means will be actuated for returning the softener to service. Thereafter, the switch operating member 176 should be moved to its opposite position to release the relay 173 and then returned to the position shown in Fig. 3 and the periodic testing of the effluent soft water will be resumed.

Attention is now directed to Fig. 12, wherein I have shown a modified or optional form of observation cell, lamp, and light sensitive cell assembly adapted for use in the testing of fluids wherein some light absorption characteristic of the fluid which is not under test is apt to change or vary so as to introduce inaccuracy into the determinations. This mechanism is also of value in correcting for changes in voltage regulation of the current supply to the lamp. Under other circumstances it is desirable to secure control through relay contacts on either side of a definite optimum condition of the liquid under test. Under each of these conditions a null method is desirable. Lamps 189 and 191 are connected to a common source of power by leads 66a and 67a which may correspond to the lines connected to the lamp 155 of Fig. 3 with a regulating potentiometer 192 arranged as shown so that a difference of light flux may be accomplished by simultaneous reduction of light from one lamp and increase from the other. Light from these two lamps is projected through observation cells 37a and 37b onto light sensitive cells 193 and 194. These cells are connected in series as shown and thence into the circuit of the microammeter 158 and sensitive relay 162 by means of leads 195 and 196, the leads 195 and 196 being identical with the leads passing out of the light sensitive cell 157 shown in Fig. 3. In other words, the lamps 189 and 191 are substituted for the lamp 155 of Fig. 3, the observation cells 37a and 37b are substituted for the observation cell 37, and the light sensitive cells 193 and 194 are substituted for the light sensitive cell 157 of Fig. 3. The device of Fig. 12 may likewise be used in the construction of Fig. 2 in a manner obvious to those skilled in the use of such cells. It will be seen that so long as the samples under observation in the cells 37a and 37b are uniform, the output of the light sensitive cells 193 and 194 will be uniform and no current will flow in the lines 195 and 196, since the light sensitive cells are arranged in opposition so that only the difference in the energy generated in the two cells flows in the lines 195 and 196. While numerous uses of this combination will be apparent, one use thereof in the control of water softening arises in the case where the water contains some type of coloring matter. Under such circumstances the flow of water would be directed simultaneously into both cells in the manner heretofore described, but reagent is injected into the water contained in only one cell, as, for example, the cell 37a. It will be seen that under these circumstances the stoppage of light in the two cells due to the extraneous coloring matter would be uniform, but the cell 37a will have a stoppage of light due to the precipitate and the current flowing in the lines 195 and 196 will be solely responsive to the precipitate or color formed by the reagent regardless of variations in the natural color of the water.

Referring now more particularly to Figs. 4 to 8, inclusive, the numeral 197 indicates generally the top plate of a frame adapted to support and carry the various elements of the invention. A cover 200 rests over the plate and a gasket 200a is positioned therebetween to prevent the access of moisture to the area above the plate and the resultant precipitation of moisture on the outer surfaces of the observation cell which might occur under adverse conditions. The plate has an upstanding cell supporting portion indicated generally at 198 having a cylindrical recess 199 for the reception of a glass tube 201, a gasket 202 being interposed between the end of the tube and its support. A housing 203 covers the opposite end of the tube and partially encloses the sides of the tube, but leaving a space on each side of the tube uncovered to provide windows as shown at 204. The liquid to be tested enters the cell 201 by way of the tube 41 through a channel 206 into a valve chamber 207 and thence through a channel 208 into the interior of the observation cell. A valve 209 acts to close the channel 206 and has a stem 211 passing through an opening in an actuating arm 212, spaced nuts 213 and 214 abutting against the faces of the lever but allowing certain free movement of the lever with respect to the valve stem. The lever 212 is pivoted on the bottom of the plate 197 as shown at 215 and is operated by the push rod 152, the push rod passing through a flexible diaphragm 216 being clamped thereto by collars 217. The diaphragm prevents entrance of air into the area above the plate 197. The liquid leaves the observation cell by way of the pipe 42. Reagent is conducted to the observation cell from a suitable source of supply by the pipe 48 and passes through a ball check valve 221 and through a bore 222 to a diaphragm type pump 223 and thence through a channel 224 through a ball check valve 225 and a channel 226 into the interior of the observation cell. The pump 223 is of conventional design and includes a supporting bracket 227 attached to the bottom of the plate 197 which supports a rubber diaphragm 228 and a stem 229. The upper end of the stem carries a disk 231 bearing against the diaphragm and a spring 232 between the diaphragm and the frame acts to urge the stem downward. A spring 233 on the stem 229 moves the disk 231 through an injection stroke. The lower end of the stem 229 passes through an opening in the lever 212 and has spaced abutments 234 against which the lever abuts in its movement to actuate the pump. The lever is urged in a counterclockwise direction by means of a coiled spring 235. Thus, as previously set forth during the first operation of the motor 135, the valve 209 is opened to establish a flow of water through the observation cell and the disk 231 of the pump is moved to a lower position, thereby drawing in a measured sample of reagent past the check valve 221. This is accomplished by a clockwise rotation of the lever 212 by means of the rod 152 and cam 151. Upon the next period of operation of the motor 135, the lever 212 is caused to move in a counterclockwise direction closing the valve 209 and injecting reagent into the observation cell past the check valve 225.

An important feature of the invention is shown in Figs. 5 and 9 to 11 and comprises means for keeping the windows of the observation cell free of accumulations tending to interfere with the transmission of light therethrough. In the form shown in Figs. 5 and 9 a rectangular frame 236 is positioned in the observation cell and carries a pair of blades 237 and 238 formed of spring metal and positioned to bear against the cylindrical inner surface of the tube 201. This frame has a trunnion 239 seated for rotation in the housing 203 and a shaft 241 connected to the cam shaft 138 and driven by the motor 135. The frame and attached blades move in a direction such that the scraping edge is forward, that is, in a counterclockwise direction facing Fig. 9 and the housing 203 covers the sides of the tube 201 to such an extent that the frame does not interfere with the passage of light through the windows during a large part of its movement so that the wiping operation can continue without interrupting the light beam.

In Fig. 10 I have shown a construction wherein the walls of the cell are wiped by a reciprocatory movement longitudinally of the tube. In this case the incoming liquid enters a chamber 242 which has a scraper supporting web 243 carrying on its forward end oppositely curved scraping blades 244 of resilient material, the liquid passing from the chamber 242 into the observation cell by way of channels 245 in the forward end of the scraper. The web 243 is carried on a rod 246 reciprocable by a cam 247 carried on the cam shaft 138 and driven by the motor 135.

In Fig. 11 I have shown a still further form of cell mechanism wherein the cell is rectangular and has the windows 248 and 249 and opaque side members 251 and 252. One end of this cell is closed by an opaque wall, while the other end may be either open or closed. When the cell is set on end the upper end may, if desired, be left open. Positioned in the cell is a transverse frame member 253 carrying resilient scraper members 254 and 255 adapted to press against the inner surface of the windows 248 and 249. The frame is carried on a shaft 256 similar to the shaft 246 shown in Fig. 10 which is in turn actuated by a cam similar to that shown at 247.

It will be seen that I have provided a generally improved zeolite water softener wherein regeneration of the softener is initiated in response to the change in character of the effluent, and wherein each step of the regeneration in which liquid flows through the softener is initiated in response to changes in the effluent so that the maximum efficiency in the regeneration operation is obtained. I have also provided improved testing means for testing the character of the water and improved means for actuating the valves of a softener or other mechanism as a result of the test. I have provided improved testing means wherein a change in a light absorption characteristic of the liquid other than that under test may be balanced out so that such change does not affect the accuracy of the determination. I have provided improved means for maintaining the light transmission characteristics of the observation cell itself at a uniform point by regularly wiping the walls of the cell so as to prevent accumulation of solid material or air on the surface of the cell under adverse conditions. I have also provided a test mechanism wherein the frequency of the test is proportioned to the time of flow of the fluid being tested.

While I have thus described and illustrated specific embodiments of the invention, I am aware that numerous alterations and changes may be made therein without resort to invention, and I do not want to be limited except as required by the scope of the appended claims, in which I claim:

1. The combination in a testing device of a cylindrical observation cell having windows on opposed arcuate sides, the windows being of lesser area than the sides of the cell, means for supplying a liquid under test to said cell, means for projecting a beam of light through said cell, light sensitive means in the path of the light emerging from said observation cell and responsive to said light to measure changes in the stoppage of light by said observation cell, wiper means rotatable about the longitudinal axis of the cell over the inner surface of said cell to remove accumulations thereon affecting the light absorption characteristics of the cell, said means being shaped to be positioned substantially entirely out of registration with the windows at some point in its travel.

2. The combination in a water testing device of an observation cell having windows on opposed sides, the windows being of lesser area than the sides of the cell, means for supplying water under test to said cell, means for mixing therewith a test reagent for producing a precipitate proportional to a characteristic of said liquid, means for intermittently projecting a beam of light through the cell, light sensitive means in the path of the light emerging from the cell to measure changes in the stoppage of light caused by said precipitate, wiper means movable over the interior surface of said cell into and out of registration with said windows to remove any accumulation of precipitate thereon, and means for actuating said projecting means and said wiper in timed relationship to energize the projecting means when said wiper is out of registration with said windows.

3. The combination in a testing device, of an observation cell, means for periodically supplying a liquid under test to said cell, means for periodically projecting a beam of light through said cell, light sensitive means in the path of the light emerging from said observation cell to measure changes in the stoppage of light by said observation cell, a wiper positioned within said cell and movable periodically over the interior surface thereof to clean the interior surfaces of the cell, and means for driving said fluid supply means, said light means and said wiper intermittently in timed relationship.

ARTHUR L. RICHE.